(12) United States Patent
Hassan et al.

(10) Patent No.: US 8,138,250 B2
(45) Date of Patent: Mar. 20, 2012

(54) WAX FOR REDUCING MAR AND ABRASION IN INKS AND COATINGS

(75) Inventors: Aziz Hassan, Sugarland, TX (US); Gregory Borsinger, Chatham, NJ (US)

(73) Assignee: H R D Corporation, Houston, TX (US)

( * ) Notice: Subject to any disclaimer, the term of this patent is extended or adjusted under 35 U.S.C. 154(b) by 1415 days.

(21) Appl. No.: 10/973,606

(22) Filed: Oct. 26, 2004

(65) Prior Publication Data

US 2005/0131103 A1 Jun. 16, 2005

Related U.S. Application Data

(63) Continuation-in-part of application No. 10/137,689, filed on May 3, 2002, now Pat. No. 6,811,824.

(60) Provisional application No. 60/514,790, filed on Oct. 27, 2003.

(51) Int. Cl.
| | |
|---|---|
| A61L 15/62 | (2006.01) |
| B05D 3/00 | (2006.01) |
| B05D 3/02 | (2006.01) |
| B32B 23/08 | (2006.01) |
| B32B 27/06 | (2006.01) |
| B32B 27/10 | (2006.01) |
| B32B 21/04 | (2006.01) |
| B32B 29/00 | (2006.01) |
| C07C 67/08 | (2006.01) |
| C08J 3/00 | (2006.01) |
| C08K 3/20 | (2006.01) |
| C08K 5/09 | (2006.01) |
| C08K 5/10 | (2006.01) |
| C08K 5/11 | (2006.01) |
| C08L 31/00 | (2006.01) |
| C08L 33/00 | (2006.01) |
| C08L 91/00 | (2006.01) |
| C08L 91/06 | (2006.01) |

(52) U.S. Cl. .................. 524/310; 427/372.2; 427/385.5; 427/389.9; 427/391; 427/392; 427/393; 428/507; 428/511; 428/537.1; 428/537.5; 523/160; 523/161; 523/524; 523/275; 523/310; 524/275; 524/276; 524/306; 524/556; 106/31.61

(58) Field of Classification Search .................. 523/160, 523/161; 106/31.61; 524/275, 310, 556, 524/276, 306; 427/372.2, 385.5, 389.9, 391, 427/392, 393; 428/507, 511, 537.1, 537.5

See application file for complete search history.

(56) References Cited

U.S. PATENT DOCUMENTS

| 4,280,939 | A | * | 7/1981 | Johnson | ........................ 523/160 |
| 5,534,049 | A | | 7/1996 | Wallstrom et al. | |
| 5,889,083 | A | | 3/1999 | Zhu | |

OTHER PUBLICATIONS

"Castor Wax". Wikipedia [online] Jan 2007. Retrieved on Aug. 22, 2007. Retrieved from the Internet: <URL:http://en.wikipedia.org/wiki/Castor_wax>.*
"Castor oil", Wikipedia [online] date unknown, Retrieved on Nov. 22, 2009, Retrieved from the internet: <URL>:http:...en.wikipedia.org/wiki.*
"Soybean oil", Wikipedia [online] date unknown, Retrieved on Nov. 22, 2009, Retrieved from the internet: <URL>: http:...en.wikipedia.org/wiki.*
"Soy candle", Wikipedia [online] date unknown, Retrieved on Nov. 22, 2009, Retrieved from the internet: <URL>: http:...en.wikipedia.org/wiki.*
Notification of Transmittal of the International Search Report, mailed May 27, 2005.
International Search Report—PCT/US2004/035605.
Written Opinion—PCT/US2004/035605.

* cited by examiner

*Primary Examiner* — Patrick Niland

(74) *Attorney, Agent, or Firm* — Porter Hedges LLP; Timothy S. Westby

(57) ABSTRACT

Waxes prepared from hydrogenated plant oils, such as castor and soybean, are formulated into aqueous ink and paper coating compositions. Ink compositions comprising these waxes and evaluated for their resistance to mar and abrasion achieved rub resistance and slip performance comparable to compositions utilizing conventional wax additives, which are generally derived from petroleum. The waxes in the inventive compositions have a low iodine value (ranging from approximately 2 to approximately 5), and a melting point between approximately 120 degrees to approximately 190 degrees F. (Mettler Drop Point). These naturally derived waxes are used as an alternative to petroleum and synthetically derived waxes in the manufacture of inks and coatings for paper and cellulosic products.

21 Claims, 2 Drawing Sheets

Fig. 1 Process for the manufacture of Hydrogenated oils

WAX FOR REDUCING MAR AND ABRASION IN INKS AND COATINGS

CROSS REFERENCES TO RELATED APPLICATIONS

This application claims the benefit of U.S. Provisional Patent Application, Ser. No. 60/514,790 filed 27 Oct. 2003, the contents of which are hereby incorporated by reference herein.

This application is also a continuation-in-part of U.S. patent application Ser. No. 10/137,689, filed 3 May 2002, now U.S. Pat. No. 6,811,824, issued on Nov. 2, 2004, which application is also assigned to the assignee of the present application.

FIELD OF THE INVENTION

An embodiment of the present invention is an ink composition which includes a highly hydrogenated wax which is prepared from hydrogenated plant oils, such as castor and soybean. These waxes, when used as additives in ink and paper coating formulations, impart anti-mar, anti-rub, or anti-slip ink properties to the ink or coating. Compositions containing these waxes protect printed and coated articles against abrasion, smearing or smudging while maintaining slip properties when the ink or coating is subjected to marring forces that might occur during shipping, or handling of a coated or printed article. The waxes utilized have a low iodine value (ranging from approximately 2 to approximately 5), and a melting point between approximately 120 degrees to approximately 190 degrees F. (Mettler Drop Point). The wax includes a triglyceride whose fatty acids are predominantly stearic acid ($C_{18}$).

BACKGROUND OF THE INVENTION

Inks and coatings are used for printing text and images on a variety of different surfaces (or substrates), ranging from cellulosic articles such as paper and corrugated cardboard, plastic articles and films, metals, to items of clothing. Ink is generally applied to a portion of the substrate in order to produce a detailed image such as letters or a picture. A coating is generally applied uniformly over an entire substrate as a continuous film. Inks and coatings that are subject to rubbing and scuffing, either in transit, storage or use, can become streaked with lines and, in the case of text, become difficult to read, or lose the image quality expected by end users.

The ultimate use of the ink has a role in determining its formulation, because certain properties are more desirable in one type of an ink than another. Various types of ink are used in processes such as high speed newspaper printing, gravure inks, flexography, thermal offset, heatset, letter press, screen printing, spraying, brushing, or the like.

For the purpose of the present invention the term flexographic ink shall refer to the ink used in flexography, flexography being defined as ". . . us[ing] raised rubber or photopolymer plates (for printing), and requires far shorter make-ready than letterpress or offset printing . . . Flexography is used for printing milk cartons, narrow-web labels, flexible packaging, corrugated board and paperback books". (A. Glassman, 1985, *Printing Fundamentals*, TAPPI Press, p. 322). In addition, flexography can be used for printing on other substrates, such as plastic films, foils, coated and uncoated papers, and paperboard.

Additives are often incorporated into inks and coatings by being mixed or ground into the ink or coating formulation with pigments; added as a part of the final ink blend; or introduced at other times. Printing inks in particular utilize such additives, so that the ink will not rub off when the substrate surface is subjected to the normal abrasive forces encountered in use and handling, such as during handling of paper products, or during shipment of corrugated cartons under the moist conditions that accompany the handling of refrigerated or frozen goods, or goods shipped packed in ice. Addition of selected additives often also yields improved slip properties. Slip properties permit other printed pages to contact and rub over the ink or coating without causing the ink to smudge. Controlled slip is often desirable for such articles as magazines that are to be stacked; it would be undesirable to have the stack slide apart. One way of controlling the slip property is utilization of micronized waxes incorporated into the ink or coating. It is theorized that the underlying mechanism involves some interlocking of wax particles between the two coated surfaces. The wax is micronized, and dispersed in the formulation to such a degree that it cannot be detected by the human eye. Dispersion of micronized waxes into the formulations also has a lesser effect on gloss reduction than if the wax were melted into the ink or coating formulation. It is known in the art that micronized waxes can render inks and coatings less susceptible to abrasion and also enable control of slip.

Some waxes used in ink and coating formulations to modify mar abrasion and slip modification are often supplied in powder form. Hard waxes are generally jet milled to a particle size ranging between approximately 5 and approximately 15 microns, with the resultant products often being referred to as 'micronized waxes'. These powdered waxes are often difficult to disperse in ink or coating formulation because of high surface tension and the need to break apart agglomerates. To facilitate their dispersion in ink or coating formulations, suppliers of micronized waxes often surface treat the powder with surfactants or other dispersing aids, or mill the powder into a paste that is more readily dispersed into the final ink or coating formulation.

The jet milling of wax into micronized particle sizes is an energy intensive process which also generates heat. This process may often cost more than the value of the wax itself. Harder waxes, defined as those having a hardness of less than 6 dmm (as measured by the needle penetration test for wax hardness) jet mill easier than softer waxes, and therefore cost less to micronize. The melting point of the wax also affects the ability of a wax to be micronized; if the melting point is too low, the heat generated in the jet milling may cause the wax to melt, rendering the process incapable of micronizing the wax. Addition of mechanical chillers to jet mills has been utilized, but because it increases milling costs still further, it is generally considered not to be cost effective.

Many commercially available anti-abrasion compounds contain polytetrafluoro-ethylene ("PTFE") in the form of a micronized powder. PTFE, commercially available from E.I. DuPont, Wilmington, Del. and sold under the trademark TEFLON®, has a low surface energy making it difficult to disperse and requiring long mixing times. One such PTFE-containing compound is Protech 120, sold by Carroll Scientific, Inc. (a division of Lubrizol Corp, Wickliffe, Ohio) which is described as a high solids (approximately 83%) virgin PTFE wax compound, and is used in ink formulations.

Polyethylene waxes have also been used as anti-abrasion additives in the ink industry. The ink manufacturer normally incorporates these waxes as dispersions of the wax in resins, generally of the same type as the ink formulations into which they are to be incorporated.

Murayama, in U.S. Pat. No. 3,843,570 describes a porous material comprising PTFE and having micropores, which material is obtained by polymerizing a monomer capable of forming a thermoplastic resin. The resultant material is suitable with inks and is also printable.

U.S. Pat. No. 5,158,606 (Carlick et al.) describes a printing ink composition with a high degree of rub-off resistance comprising a dispersion of a pigment in a vehicle containing a $C_7$-$C_{40}$ oil and a polymer latex emulsified in the dispersion. The inventors state that synthetic waxes, such as the polyethylene or PTFE waxes, are the most popular ones used in the ink industry. They also indicate that the relative cost of PTFE waxes is prohibitively high for applications such as news inks, but where cost is not of paramount concern, a PTFE wax with petrolatum can be added to the oil/polymer latex ink composition.

Mueller et al. (U.S. Pat. No. 5,643,984) disclose a wax composition for the printing ink industry which utilizes polyethylene waxes and oxidized polyethylene waxes; Fischer-Tropsch waxes; microcrystalline or carnauba waxes in an ink formulation based on either an aromatic or aliphatic solvent.

The prior art illustrates the use of petroleum-derived waxes and synthetic waxes for formulating ink and coating compounds. There are no mentions of vegetable derived waxes for use in ink and or coating formulations, yet there is a recognized and long-felt need to find alternatives to products such as PTFE, expensive synthetic waxes such as microcrystalline waxes, and other petroleum waxes that are derived from increasingly scarce and limited natural resources. There is also a recognized and long-felt need to use materials in inks and coatings that are considered safe to humans because of the ink or coating's use in the manufacture of paper and plastic packaging used to transport and store foodstuffs. There is also a recognized and long-felt need to use materials in ink and/or coatings that are naturally derived and can be easily recycled back into the environment without long-term adverse effects; consumer packaged goods, for example, are known to be difficult to recycle. Therefore, there is a need for employing a wax, which has similar properties of commercially available PTFE, and petroleum derived or synthetic waxes used in ink and coating formulations. Due the large volume of waxes consumed in these applications it is also preferred that the compositions be readily available. From both a supply and a natural resource viewpoint, it is preferred that the compositions be obtained from a source that preferably is renewable, such as from plant extracts.

There is a need for a wax that is hard and high melting and can be micronized into powder cost effectively. Given that the world's petroleum supply is finite, and dwindling, it is also desirable to have a wax that can be obtained from a renewable source, such as plants, rather than being petroleum based.

The anti-abrasion properties of the waxes of the present invention are most useful for water based inks and coatings and are particularly suited for use in flexographic inks. These waxes are particularly well suited for rendering inks and coatings less susceptible to mar and abrasion because they are very hard relative to most conventional petroleum based waxes and they are derived from renewable natural resources.

BRIEF SUMMARY OF THE INVENTION

It is an object of the present invention to provide a wax composition that can be incorporated into ink and coating formulations.

Another object of the present invention is to provide an ink or coating composition, which can be subsequently applied to articles such as paper, paperboard and the like for use in consumer and other packaged goods applications.

Another object of the present invention to provide a wax composition that can be incorporated into ink and coating formulations as a substitute for petroleum-derived waxes currently used in such formulations.

Another object of the present invention is to provide a wax composition that is readily dispersed in ink and coating formulations.

Still another object of the present invention is to provide a wax composition which when formulated into an ink or coating, and which ink or coating is applied to an article as a barrier or for identification or information, the ink or coating has anti-mar, anti-abrasion and anti-rub performance characteristics similar to that of a conventional product presently used for this purpose.

Yet another object of the present invention is to provide a wax composition that can be derived from a renewable resource in place of non-renewable petroleum based compositions.

Still another object of the present invention is to provide a wax composition which can be derived from a renewable resource and which can be economically produced.

Another object of the present invention is to provide a wax composition for use in ink and coating and for paper coating and have properties that are generally regarded as safe by the Food and Drug Administration.

Another object of the present invention to provide an anti-rub, anti-abrasion and anti-mar ink and coating additive for water based inks and coatings, which is useful for increasing their performance properties. The additive of the present invention maintains good gloss and degradation properties in the ink or coating formulations in which it is used.

The waxes used in the present invention meet the rigorous requirements for these and other applications. The present inventors have unexpectedly discovered that highly hydrogenated oils such as palm, soybean and castor can be converted into a wax that can be used effectively as substitutes for conventional petroleum and synthetic waxes in the formulation of ink and/or adhesive compounds.

An embodiment of the present invention comprises a highly hydrogenated vegetable oil (derived from sources such as palm, soybean, and castor) that has wax-like properties and can be formulated using conventional means with other components in the manufacture of ink and coating compounds, to produce ink and coating compositions which have mar and abrasion characteristics similar to ink and coating formulations containing a commercially available micronized wax.

Ink compositions comprising the inventive waxes evaluated for their resistance to mar and abrasion achieved rub resistance and slip performance comparable to conventional wax additives, which are generally derived from petroleum. The inventive waxes have a low iodine value (ranging from approximately 2 to approximately 5), and a melting point between approximately 120 degrees to approximately 190 degrees F. (Mettler Drop Point). The wax includes a triglyceride whose fatty acids are predominantly stearic acid ($C_{18}$). The naturally derived waxes are used as an alternative to petroleum and synthetically derived. These waxes have the additional benefit of being soluble under mild alkaline conditions. This allows for cleaner and easier recycling of articles prepared using hydrogenated vegetable oil wax versus conventional petroleum-derived waxes. This is important in consumer packaged goods where packaging is often recycled using warm alkaline water.

An embodiment of the present invention is an ink formulation including a natural wax. Another embodiment of the present invention is a coating formulation for paper and other cellulosic products which includes a natural wax. The product is a highly hydrogenated wax derived from the processing of natural oil containing commodities such as soybeans, palm, castor bean and other crops from which oil can be obtained. Although hydrogenated vegetable oils are widely used in the food industry; highly hydrogenated vegetable oils, such as those in embodiments of the present invention, are not widely produced or used because of their limited applications in the food industry. The materials are processed and supplied by Archer Daniels Midland (Decatur Ill.) designated by their product number 86-197-); Cargill Incorporated (Wayzata, Minn.) designated by their product number 800mrcs0000u and other sources under a generic name 'hydrogenated soybean oil'. Palm oil wax, supplied by Custom Shortenings & Oils (Richmond, Va.) was designated as Master Chef Stable Flake-P. Nat Wax 185 is a blend comprising 20% castor wax and 80% soybean wax, furnished by Marcus Oil and Chemical, Houston, Tex. (a division of HRD Corp., Houston, Tex., the assignee of this application).

DETAILED DESCRIPTION OF THE INVENTION

Figure 1:
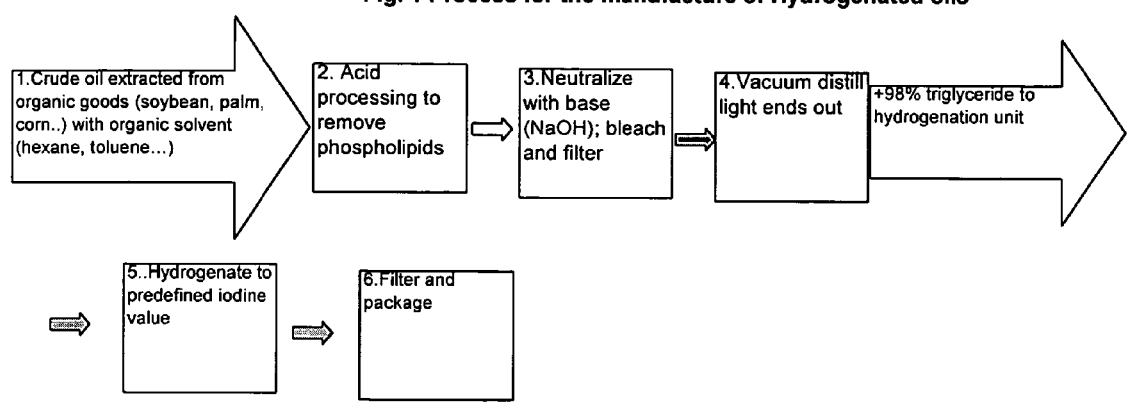
FIG. 1 is a flow chart illustrating a process for the manufacture of hydrogenated oils.

An embodiment of the present invention is a wax composition, derived from compounds of plant origin, which can be used as an alternative to petroleum derived wax (both paraffin and synthetic ethylene derived waxes) in formulating ink and coatings that are subsequently used to print and coat various articles, yet which composition yields mar and abrasion properties similar to inks and coatings containing synthetic waxes or petroleum-derived waxes.

Naturally occurring and synthetic waxes are extensively used in a wide cross-section of industries including, but not limited to, the chemical, cosmetic, food preparation, personal hygiene, pharmaceuticals and printing industries. The term wax is used to denote a broad class of organic ester and waxy compounds, which span a variety of chemical structures and display a broad range of melting temperatures. Often the same compound may be referred to as either a "wax," "fat" or an "oil" depending on the ambient temperature, the chain lengths of the esterified fatty acids, and their degree of saturation or unsaturation. Generally, the greater the degree of saturation and the longer the chain length of the esterified fatty acids, the higher will be the melting point of the compound.

By whatever name it is called, the choice of a wax for a particular application is often determined by whether it is a liquid or solid at the temperature of the product with which it is to be used. Among the factors that determine whether a wax is a liquid or a solid at a given temperature are properties such as the degree of saturation or unsaturation of the components of the wax, primarily the fatty acids, and a property such as the iodine number, or iodine value ("IV"). The iodine value measures the amount of iodine absorbed in a given time by a compound or mixture, and the IV is thus a measure of the unsaturation, or number of double bonds, in that compound or mixture. Generally, the greater the degree of saturation and the longer the chain length of the esterified fatty acids, the higher the melting point. Similarly, the lower the iodine value of the compound, the harder, and more solid it will be at a particular temperature.

The term "triglyceride" will refer to fatty acid esters of glycerol. Within the context of the present specification, the term "free fatty acid" will refer to a fatty acid that is not covalently bound through an ester linkage to another molecule; the term "fatty acid component" will be used to describe a fatty acid that is covalently bound through an ester linkage to another molecule, such as glycerol.

Waxes can be obtained from a number of natural sources, among which are petroleum products and extracts of plants. Petroleum and plant extracts are complex mixtures, and purification steps are often required to obtain waxes from them. Frequently it is necessary to extensively purify and chemically modify a wax to make it useful for a given purpose. Despite such efforts at modification, many physical characteristics of waxes still prevent them from being used successfully or demand that extensive, and oftentimes, expensive, additional treatments be undertaken.

Many commercially utilized triglycerides and free fatty acids are obtained preferably from plant sources, including canola, carnauba, castor, cottonseed, corn, cranbe, palm, soybean and sunflower oils, and are used after being refined by processes known to those skilled in the art. For example, plant triglycerides may be obtained by solvent extraction of plant biomass using aliphatic solvents. Subsequent additional purification may involve distillation, fractional crystallization, degumming, bleaching and steam stripping. The triglycerides obtained are partially or fully hydrogenated. Furthermore, fatty acids may be obtained by hydrolysis of natural triglycerides (e.g., alkaline hydrolysis followed by purification methods known in the art, including distillation and steam stripping) or by synthesis from petrochemical fatty alcohols. The free fatty acids and triglycerides may further be obtained from commercial sources, such as Archer Daniels Midland Co., Cargill, Central Soya and others.

As used in embodiments of the present invention, the free fatty acids and fatty acid components of the triglycerides have various chain lengths, and are saturated. The properties of the wax, such as melting point, varies as a function of the chain length and degree of saturation of the free fatty acids and the fatty acid components. As the degree of saturation decreases, the melting point decreases; similarly, as the chain length of the fatty acids decreases, the melting point decreases. Preferred free fatty acids are saturated fatty acids, such as palmitic acid, and other saturated fatty acids having longer carbon chain lengths, such as arachidic acid and behenic acid. Stearic acid is further preferred.

Vegetable oils or animal fats can be synthetically hydrogenated, using methods known to those skilled in the art, to have low or very low iodine values. Fats naturally composed primarily of saturated triglycerides (such as palm oil or fractionated fats) can be used alone or in blend formulations with mar and abrasions/laminants to achieve an enhanced water tolerance for composite materials.

Saturated triglycerides having a low iodine value (a range of iodine values of about 0-70 with 0-30 preferred) may be produced by hydrogenation of a commercial oil, such as oils of soybean, soy stearine, stearine, castor, corn, cottonseed, rape, canola, sunflower, palm, palm kernel, coconut, crambe, linseed, peanut, fish and tall oil; or fats, such as animal fats, including lard and tallow, and blends thereof. These oils may also be produced from genetically engineered plants to obtain low IV oil with a high percentage of fatty acids.

Fats are commonly fractionated by a process known as "winterization", wherein the mixture is chilled for a period of time long enough to allow the harder fractions of the fats to crystallize. This chilling is followed by filtration, with the harder fractions being retained on a filter cake. These harder fractions have a lower iodine value and, therefore, a melting point that is higher than the melting point of the fat from which it has been separated. Hence, winterization can be used as a source for lower IV fats.

The winterization process is generally used to fractionate animal fats, and can thus produce a variety of animal fat fractions, having differing iodine values and consequently, differing chemical properties. These fractions can be blended with fatty acids and free fatty acids obtained from other sources, such as plant or vegetable extracts referred to above, and these blends could be used in the present invention.

Embodiments of the present invention employ a highly hydrogenated triglyceride (wax) where the iodine value is close to zero thereby rendering the compound more thermally stable. The waxes can be chosen from those having an iodine value of between 0 to 30, but a wax having an iodine value ranging between 2 to 5 is preferred.

There are many different types of ink and coating formulations. The selection of type ink depends on many factors including:

i) Type of equipment used to coat or print;

ii) The need to reduce volatile emissions from the ink or coating; and iii) The physical properties of the ink or coating required (including solubility, barrier properties, compatibility, color).

Ink and coating formulations generally include a film forming polymer or resin and a pigment or dye. Inks and coatings are routinely used to print and coat consumer packaged goods, for example only, but not limited to, items such as corrugated cardboard used for cartons; milk containers; paper containers; kraft paper; linerboard; paper and the like.

The level of wax generally incorporated into ink and adhesive coatings to render them more mar and abrasion resistant ranges from approximately 0.5%-5% by weight of the formulation. In other embodiments, the wax may comprise approximately 1% to approximately 3% by weight of the formulation, and in other embodiments, the level of wax in the formulations of the present invention is in the range of approximately 1% to approximately 2% by weight of the formulation.

In an embodiment of the composition of the present invention, the ink or coating formulation used is water based due to the functionality and compatibility of the hydrogenated vegetable oil wax with other components of water based ink and coating formulas. Embodiments of the present invention are particularly well suited for water based flexographic inks which are widely used in industry. Embodiments of the present invention could be used in other types of printing inks, provided that the waxes are compatible with the other components of the formulation, and that there is no swelling or degradation of the waxes in such formulations. One example of an ink formulation consists essentially of between 20%-60% (weight percent) of an acrylic resin dispersion, between 5%-30% (weight percent) of a pigment, between 0.5%-10% (weight percent) of an alcohol, between 0.01%-5% (weight percent) of a defoaming agent, between 20%-75% (weight percent) of an aqueous solvent, and between 0.5%-5% (weight percent) of a hydrogenated, vegetable wax, the wax being characterized by an iodine value between 2 and 5.

Environmental concerns, such as the increasingly stringent regulation of air quality, pollution and hazardous waste disposal issues have created a need for alternatives to the use of petroleum, petroleum-based products, or other organic solvent-based ink compositions. Water-based and/or soy-based ink formulations are being developed in order to reduce the amount of volatile organic compounds released into the air during printing.

Embodiments of the present invention use a natural wax in ink and coating mar and abrasion formulations. The waxes used include a palm oil wax, a soybean wax, a castor oil wax, and a blend of soybean wax and castor wax, the waxes being prepared from hydrogenated oil. The blend of castor oil wax and soybean wax, in a ratio of 20%:80%, is sold as NAT 185 Wax (Marcus Oil and Chemical, Houston, Tex.). These waxes can be used as food additives.

The properties of the soybean wax are summarized in Table 1, where it can be seen that this wax has an IV of approximately 2. The IV of the palm wax (Table 2) is approximately 5.

TABLE 1

Typical properties of Hydrogenated Soybean Oil (Archer Daniels Midland (Decatur Ill.) designated by their product number 86-197-0)

| Property | Typical analysis |
|---|---|
| Lovibond Red Color | 2.0 max |
| Saponification | 180 mgKOH/g |
| Viscosity | 60 SUS @ 210 F. |
| Hardness (needle penetration) | 2 dmm @ 77 F. |
| % FFA Max.* | 0.10 max |
| Flavor Min. | Characteristic |
| P.V. Mil eq/kg/max. | 1.0 max |
| F.I. min** | 8.0 min |
| Specific gravity (H2O = 1) | 0.92 |
| % Moisture max. | 0.05 max |
| I.V. by R.I. | 2.0 max |
| Iron (ppm) | 0.3 max |
| Soap (ppm) | 3.0 max. |
| Nickel (ppm) | 0.02 max |
| Copper (ppm) | 0.05 max. |
| Phosphorous (ppm) | 15.0 Max |
| Residual Citric Acid (ppm) | 15.0 max |
| Mettler Drop Point (F.) | 155-160 |
| Typical Fatty Acid Composition (by GLC) | |
| C 14:0*** | 3.0 max |
| C 16:0 | 3-14 |
| C 18:0 | 82-94 |
| C 20:0 | 5 max |

*FFA: Free Fatty Acids.
**F.I.: Flavor Index
***number of carbon atoms:number of double bonds (e.g., 18:2 refers to linoleic acid palmitic acid (16:0), stearic acid (18:0), oleic acid (18:1), arachidic acid (20:0) and behenic acid (22:0)

TABLE 2

Typical properties of Hydrogenated Palm Oil
(Custom Shortenings & Oils (Richmond, VA)
product Master Chef Stable Flake-P.)

| Property | Typical analysis |
| --- | --- |
| Lovibond Red Color | 4.0 max |
| % Free Fatty Acids Max. | 0.10 max |
| Flavor Min. | Bland |
| Iodine Value. by R.I. | 5.0 max |
| Mettler Drop Point (F.) | 136-142 |
| Saponification | 185 mgKOH/g |
| Viscosity | 65 SUS @ 210 F. |
| Hardness (needle penetration) | 2-3 dmm @ 77 F. |
| Typical Fatty Acid Composition (by GLC) | |
| C 8:0* | 0.3% max |
| C 10:0 | 0.3 max |
| C 12:0 | 0.5% max |
| C 14:0 | 1.1% max |
| C 16:0 | 39.5% min |
| C 18:0 | 53.0% min |
| C 18:1 | 1.0% max |
| C 18:2 | 0.5% max |

*number of carbon atoms:number of double bonds (e.g., 18:2 refers to linoleic acid The soybean oil wax has a melting point, as measured by Mettler Drop Point, of between 155-160 degrees F., while that of the palm oil wax is between 136-142 degrees F.

These waxes are further characterized by having a viscosity of between 10-200 cps at a temperature of 210 degrees F.

Each wax comprises 98% triglyceride by weight with trace amounts of fatty acids. The triglyceride can be saponified through the addition of a base such as KOH to yield a saponification value. Saponification values will vary depending mainly upon the chain length of the fatty acid which is a function of the source of the vegetable wax. For hydrogenated soy and palm wax the saponification value is usually in the 180-200 mgKOH/g range.

When the waxes were analyzed for their fatty acid content using known methods of Gas Liquid Chromatography ("GLC"), the soybean wax (Table 1) was found to comprise between 82-94% stearic acid ($C_{18:0}$) and between 3-14% palmitic acid ($C_{16:0}$). By comparison, the palm oil wax (Table 2) comprises approximately 55% stearic acid ($C_{18:0}$), 39.5% palmitic acid ($C_{16:0}$), 1.1% myristic acid ($C_{14:0}$) and approximately 1.0% oleic acid ($C_{18:1}$).

Castor wax, also referred to as hydrogenated castor oil, is catalytically hydrogenated castor oil (hydrogenation of castor oil in the presence of a nickel catalyst). Castor wax is a hard, brittle wax that is extremely insoluble in water and in commonly used organic solvents, as known to those skilled in the art. The wax has a melting point of approximately 183 degrees F. to approximately 185 degrees F. (approximately 84 degrees C. to approximately 88 degrees C.), and is characterized by having an acid number of 2-3 (mg KOH/g), a saponification number of about 174-186 (mg KOH/g), and an iodine number ranging from approximately 3 to approximately 4.

Castor wax has been used in the preparation of coatings that are either water-repellant, or resistant to oils, petroleum and petroleum derivatives. While a major use of castor wax is in manufacturing greases, it is also used in paper coatings for food packaging and cosmetic applications, and derivatives of castor wax are used as surfactants and plastics additives. There is a difference in the stearic acid content of these waxes, the palm and soy waxes having between approximately 84% to approximately 92% stearic acid, and approximately 1% stearic acid in castor wax.

Properties of the blended wax (NAT 185) are described in Table 3; this wax has a melting point of approximately 185° F. (85° C.) and an IV of 5 maximum.

An ink composition generally includes four elements, a colorant, a vehicle, a solvent and additives. The colorant is used to provide the visible image on the substrate, and the colorant can be either a pigment or a dye, depending upon the ultimate use of the ink formulation. The vehicle serves to bind the colorant to the substrate, and also serves as the carrier of the ink on the press. The solvent may be part of the vehicle; it serves to provide a means for drying, and is used to solubilize other components which provide flow properties to the vehicle, while the additives are used to impart a variety of special properties to the ink formulation.

The colorants can be divided into either pigments or dyes, the dyes characterized by being soluble in the ink vehicle, while the pigments are characterized by being insoluble in either the ink vehicle or the solvent used in the ink. The colorants include black pigments, which are generally forms of carbon black, and white pigments, which may be either transparent or opaque. The opaque white pigments generally include either titanium dioxide ($TiO_2$), zinc oxide (ZnO) or zinc sulfide (ZnS), titanium dioxide being the most commonly employed. Alumina hydrate, magnesium carbonate, calcium carbonate, precipitated barium sulfate, talc or clay, and with or without one or more other agents used as extenders, are included within the transparent white pigments.

Color pigments could be either inorganic or organic (that is, synthetic). Some examples of inorganic pigments include, but are not meant to be limited to, blues such as iron blue, Milori blue, Prussian blue, chromium (III) pigments, ultramarine pigments, cyanide iron blues, cadmium pigments, lead chromate pigments (which would not be recommended for use with food containers), luminescent, metal effect and pearlescent pigments.

Among the organic pigments that could be included, but not meant to be an exhaustive list, are compounds such as azo compounds, benzimidalolones, diarylide yellows, monoazo yellow salts, dinitraniline orange, pyrazolone orange, a variety of azo reds and maroons, naphthol reds and maroons, and azo condensation pigments, such as lakes, copper phthalocyanines, quinacridines, diaryl pyrrolopyrroles, vat dye pigments, aminoanthoaquinone pigments, dioxazines, isoindolinones and isoindolines, and quinophthalones.

An embodiment of an ink composition of the present invention includes a pigment. The pigment may be selected from the inorganic or organic pigments described above, from the synthetic dyes, or combinations of the pigments and/or dyes, is determined by factors such as the desired color of the final product, or the final use of the ink. One embodiment of the present invention employs a black pigment, and the black pigment is carbon black.

The solvent can be selected from a variety of aqueous or nonaqueous solvents, such as, but not intended to be limited to, water, alcohols such as ethanol, propanol, isopropanol, n-butyl alcohol, isobutyl alcohol or sec-butyl alcohol; ketones such as acetone, methyl ethyl ketone, methyl isobutyl ketone, methyl isoamyl ketone or cyclohexanone; esters such as methyl acetate, ethyl acetate, isopropyl acetate, n-propyl acetate, n-butyl acetate, isobutyl acetate, or amyl acetate; ethers such as DOWANOL® PM (registered trademark of Dow Chemical Co., Midland, Mich.) methyl CELLOSOLVE® (registered trademark of Union Carbide Co.), CELLOSOLVE® or butyl CELLOSOLVE®; aliphatic compounds such as hexane; naphtha, octane or mineral spirits, or aromatics such as toluene or xylene. In a flexographic ink, the solvent may comprise up to 70% of the composition. Other types of solvents could be petroleum-derived solvents, such as an aliphatic petroleum fraction having a boiling point in a range of 435°-535° F., used primarily in heat-set lithography and letterpress printing, at concentrations ranging from 35-45%, or 450-50%, respectively. Other petroleum fractions such as toluene, lactol spirits, esters and ketones, may be used in gravure printing formulations, and the solvent may comprise up to 85% of the ink composition. However, because of environmental considerations and regulations, the use of solvents which do not emit quantities of volatile organic compounds into the atmosphere is preferred. An embodiment of the present invention utilizes water as the solvent.

In commercial production, these wax-containing inks could include the incorporation of additives, such as, but not limited to, surfactants, solvents and/or co-solvents, and/or other stabilizing agents and/or preservatives to increase the shelf life of the ink formulations. Some of these additives may be included in the composition within the range of about 0.001% to about 7% by weight of the composition. These agents may be chosen from among the group consisting of an anti-misting agent, a biocide, a defoamer, a dispersing agent, an antioxidant, an ultraviolet ("UV") absorber, light stabilizers, a flow agent, a gloss enhancer, a pH regulator, a preservative, a rheology (viscosity) modifier and an anti-settling agent.

Examples of preservatives and biocides include sodium dehydroacetate, 2,2-dimethyl-6-acetoxysiloxane, ammonium thioglycolate; biocides such as the DOWICILs® (Dow Chemical Co, Midland, Mich.), for example DOWICEL 75, 150 and 200, benzoate salts, sorbate salts and the like, in concentrations ranging from approximately 0.0001 to approximately 5% by weight.

Examples of agents that could be used for regulating pH include acids, bases, amine salts, carboxylate salts, phosphate salts, sulfite salts, amine salts, and others, present in concentrations ranging from approximately 0% to approximately 1% by weight.

Examples of agents which could be used as rheology (viscosity) modifiers include polyvinyl alcohol; modified celluloses such as hydroxypropyl cellulose, carboxymethyl cellulose, hydroxyethyl cellulose, methyl cellulose; water-soluble acrylic resins and polyvinylpyrollidone. Examples of surface tension control agents are anionic and cationic surface active agents such as polyethylene glycol ether sulfate, ester salts and the like as anionic compounds; and polyoxyethylene alkyl ethers, polyoxyethylene alkylphenyl ethers, polyoxyethylene alkyl esters, polyoxyethylene sorbitan alkyl esters, polyoxyethylene alkylamines and similar compounds, such as surfactants of the TWEEN® and TRITON® series (Rohm and Haas Co., Philadelphia Pa.). as nonionic compounds. Sodium lauryl sulfate and related compounds could also be used. Surfactants of the IGEPAL® (Rhodia, Inc., Cranbury, N.J.) or TERGITOL® (Dow Chemical Co., Midland, Mich.) series could be used.

Additionally, one or more humectants could be added. Examples of such humectants include polyols such as ethylene glycol, diethylene glycol, triethylene glycol, tetraethylene glycol, propylene glycol, dipropylene glycol, glycerol and polyethylene glycols or various molecular weight ranges. Depending upon the ultimate use, such humectants may comprise up to about 15% by weight of the composition.

An embodiment of the present invention is based on an aqueous flexographic ink. The ultimate use of the ink, such as for high speed newspaper printing, gravure inks, thermal offset, heatset, letter press, screen printing, spraying, brushing, or the like, will determine which additive or additives, and concentrations thereof, that will be added to the final formulation.

Although the present invention has been described with a certain degree of particularity, it is to be understood that the examples below are merely for purposes of illustrating embodiments of the present invention, the scope of the present invention is intended to be defined by the claims.

PREPARATION OF EXAMPLES

Example 1

Properties of the Waxes

A commercially available blend of hydrogenated soybean oil and hydrogenated castor oil known as STEROTEX® K (Abitec Performance Products, Columbus Ohio) was jet milled in a MICRON-MASTER® jet mill (Custom Processing Services, Reading Pa.) to a particle size of 10 microns. The material micronized readily. This micronized material is commercially available as Marcus NAT-185 wax (Marcus Oil & Chemical, Houston, Tex.)). The NAT 185 wax is a blend of hydrogenated castor oil wax (20%) and hydrogenated soy wax (80%).

Another commercially available wax (S-368 N5T, from Shamrock Technologies) was used for comparative purposes with the wax composition of the present invention. The properties of these waxes are summarized in Table 3.

TABLE 3

| Wax Properties | |
|---|---|
| Product | Property |
| Shamrock S-368 N5T[1] | |
| Appearance | White Free Flowing Powder |
| Hegman[2] | 7 |
| Average Micron Size | 12.5 |
| Specific Gravity (Gm/cm$^3$) | 0.93 |
| Melt Point ° F./° C. (Mettler Drop Point) | 207/97 |
| Softening Point ° F./° C. (ASTM D36) | 145/63 |
| Viscosity (Brookfield) | 185 cps at 140° C. |
| Iodine Value | <1 |
| Marcus NAT 185[3] | |
| Appearance | White Free Flowing Powder |
| Hegman | |
| Average Micron Size | 10 |
| Specific Gravity (Gm/cm$^3$) | 0.92 |
| Melt Point ° F./° C. (Mettler Drop Point) | 185/85 |
| Softening Point ° F./° C. (ASTM D36) | 156/66 |
| Viscosity (Brookfield) | 10 cps at 100° C. |
| Iodine Value | 5 maximum |

[1]Shamrock Technologies, Inc. Foot of Pacific Street, Newark, New Jersey
[2]Hegman indicates particle size based on Hegman Scale, which conforms to ASTM-D 1210 (Test Method for Dispersion of Pigment Vehicle Systems by Hegman-type Gage).
[3]Marcus Oil & Chemical, 14549 Minetta, Houston Texas Example 2

Ink Formulations

To test the effectiveness of the wax composition of the present invention, ink formulations of a water-based flexographic ink were prepared including a commercially used wax (Shamrock S-368 N5T), the inventive wax (NAT 185) and a control preparation containing no wax additives. Starting with a master batch of a water-based commercial black ink known to contain no wax, a small quantity (100 gm) of water-based test inks (100 gr.) were made. The composition of the black ink, a commercially used ink formulation, sold by Weber and Permut, Inc. (Linden, N.J.) is summarized below (Table 4).

TABLE 4

Composition of Black Ink (Wax-free Master Batch)

| | |
|---|---|
| 48% | Acrylic Resin Dispersion (RHOPLEX ®, Rohm and Haas, Philadelphia, PA) |
| 14% | Carbon Black |
| 1.0% | Isopropyl Alcohol |
| 0.5% | Defoamer (SURFYNOL ® MD-20, Air Products Corp. Allentown, PA) |
| 37% | Water |

A black ink was chosen because black inks are known to easily show differences in gloss, and rub resistance tests are generally easy to read. The pH of this ink was approximately 8.2 to approximately 8.6. The three different test inks are identified in Table 5.

TABLE 5

Ink Formulations

| | Composition (Weight %) | | |
|---|---|---|---|
| aterial | 1 | 2 | 3 |
| Wax-free M/B[1] | 100.0 | 98.0 | 98.0 |
| S-368 N5T[2] | — | 2.0 | — |
| NAT-185 B101[3] | — | — | 2.0 |
| Total | 100.0 | 100.0 | 100.0 |

[1]Wax-free master batch of black ink (composition described in Table 4)
[2]Shamrock Technologies, Inc. Foot of Pacific Street, Newark, New Jersey
[3]Marcus Oil & Chemical, 14549 Minetta, Houston Texas The commercial wax chosen, Shamrock S-368 N5T, is known in the industry as a fine particles stir-in type wax, and served as a control, while the ink formulation containing no slip and rub additives served as a "blank" for these experiments.

The inks were made by first dispersing the wax into a quantity of the ink by hand on a glass plate, then giving each ink a loose pass using a lab 3-roller mill (5 inches by 2.5 inches, non-hydraulic) at ambient temperature. Care was taken not to heat the ink during processing.

The dispersed wax preparations were then added to the remaining quantity of ink using a laboratory mixer (Hamilton Beach Drinkmaster twin blade, operating at a PowerStat setting of 50) running at moderate speed, in order to reduce foaming and to prevent the inks from heating up significantly. Each ink formulation was mixed for 10 minutes.

It is recognized that for commercial production, these wax-containing inks would most likely involve the incorporation of other additives, such as, but not limited to, surfactants, co-solvents and/or other stabilizing agents and/or preservatives to increase the shelf life of the ink formulations. These additives are well known to those experienced in the art, but no attempts to prepare a long-term stable ink were made for the ink formulation batches tested in these experiments.

Example 3

Evaluations of the Ink Formulations

The test ink formulations prepared in Example 2 were tested for properties such as slip, gloss, and rub resistance.

Slip is a measurement of the resistance to movement between two objects, and is generally measured by placing two objects, one of top of the other on another surface, and raising the surface, as an inclined plane, until one object slips over the other object.

Gloss is a function of the ink's ingredients, the substrate, and the smoothness of the surface of the ink film. To test for gloss, a known amount of light is angled onto the ink surface, and picked up after reflection from the ink surface. The percent of light picked up is directly related to what an observer sees as gloss.

Rub is used to measure the resistance of the printed sample to marring from the repeated rubbing of its surface. The tester generally rubs a sample of an abrasive, or a sample of the unprinted stock, against a sample of the printed stock for a certain number of cycles and at a specified pressure. The results are judged by a visual observation of the sample.

Figure 2:
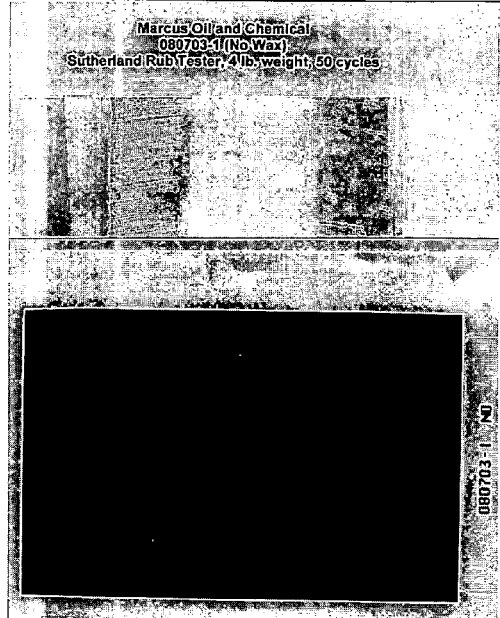
FIG. 2 illustrates results from the Sutherland Rub Test with an ink formulation containing no wax (control formulation).
Figure 3:
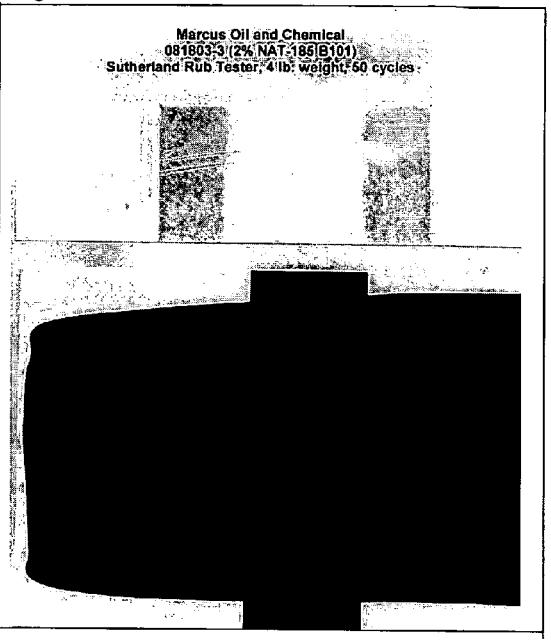
FIG. 3 illustrates results from the Sutherland Rub Test with an ink formulation containing a quantity of the Nat 185 wax (blend of hydrogenated castor oil wax and hydrogenated soy wax).
Figure 4:
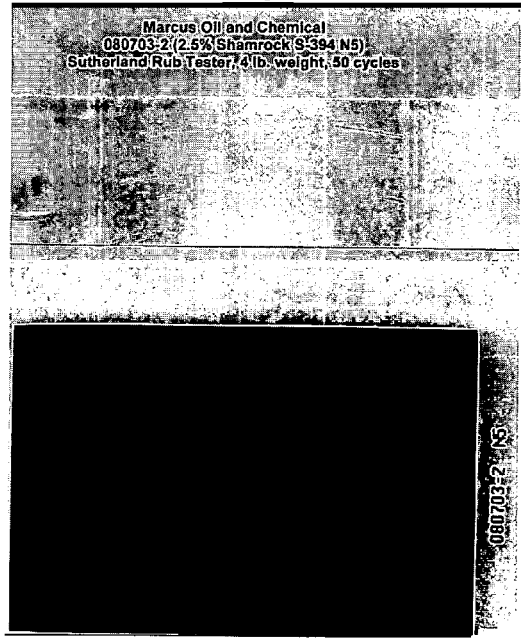
FIG. 4 illustrates results from the Sutherland Rub Test with an ink formulation containing a quantity of Shamrock S-394 N5T wax.

For each of these tests, a series of drawdowns of the three test ink formulations was made on Form 3NT-3 Coated Book Leneta Test Sheets using a #6 Meyer rod. The drawdowns were oven dried for 30 seconds at 140° F., and then allowed to stand at room temperature for 24 hours before testing.
Property: SLIP Hand rub tests were made on both sets of prints to get a feel for the slip properties of the formulations. Standard rub tests were also run on a Sutherland Rub Tester at room temperature. The tests were made using a 4 lb. weight and 50 cycles, after which the prints were evaluated for their appearance, and the prints photographed. The results, determined by visual inspection of the rubs, and shown in FIGS. 2 through 4, indicate that the formulation containing the NAT 185 wax demonstrated less rub compared to the blank formulation (FIG. 2) containing no wax. The results using the NAT 185 wax formulation were comparable to those of the Shamrock S-368 N5T wax (a comparative example). In the bottom block of FIG. 2, numerous arcuate scratches can be seen in the surface; the bottom blocks of FIGS. 3 and 4 show a greatly reduced number of arcuate scratches in their surfaces compared to FIG. 2.
Property:GLOSS Gloss readings were taken on the dried prints using a Gardner Gloss Meter with the 60° aperture. Three readings were taken on a print, the results averaged and summarized in Table 6.

TABLE 6

Gloss Readings of Ink Formulations

| | Gardner Gloss Meter, 60° Aperture | | |
|---|---|---|---|
| Sample # | 1 (no wax) | 2 (S-368 N5T wax) | 3 (NAT-185 wax) |
| Reading | 57 | 50 | 46 |

Property:RUB

Sutherland Rub Tests were also performed using these ink formulations. The following observations were made upon a visual examination of the test samples. Sample A, containing no wax showed poor slip, but fair rub resistance. Sample B, containing the Shamrock S-368 N5T wax showed good slip, and fair rub resistance, as did Sample C, containing the NAT-185 wax of the present invention, showed good slip, and fair rub resistance.

Although there was considerable rub-off of ink in the test formulations containing either the S-368 N5T or NAT-185 waxes, these formulations showed much less marring of the dry ink film than occurred with the sample containing no wax.

Based on these data, the NAT-185 wax composition of the present invention improves the slip of ink formulations to virtually the same degree as the commercially used S-368 N5T wax. The rub resistance of the S-368 N5T and NAT-185 waxes is comparable.

We claim:

1. An ink composition, comprising:
   between 20%-60% weight percent of an acrylic resin dispersion;
   between 5%-30% weight percent of a pigment;
   between 20%-75% weight percent of an aqueous solvent; and
   between 0.5% to 5% weight percent of a hydrogenated, vegetable-derived wax, the wax being characterized by an iodine value between 2 to 5, and wherein the wax is a wax comprising 20% castor wax and 80% soybean wax by weight.

2. The ink composition as described in claim 1, wherein the wax comprises between 1%-3% of the composition.

3. The composition as described in claim 2, wherein the wax is further characterized by
   a. a melting point of approximately 185 degrees F. Mettler drop point;
   b. a softening point of approximately 156 degrees F.; and
   c. a Brookfield viscosity of approximately 10 cps at 100 degrees C.

4. The ink composition as described in claim 3, wherein the solvent comprises between 20%-50% of the composition.

5. The ink composition as described in claim 4, wherein the solvent comprises between 30%-40% of the composition.

6. The ink composition as described in claim 3, further comprising between 0.01%-5% weight percent of a defoaming agent.

7. The ink composition as described in claim 6, wherein the pigment is selected from the group consisting of carbon black, an organic pigment, a synthetic pigment, and a combination thereof.

8. The ink composition as described in claim 7, wherein the pigment is carbon black.

9. The ink composition as described in claim 6, further comprising one or more agents selected from the group consisting of anti-misting agents, biocides, dispersing agents, antioxidants, ultraviolet light absorbing agents, light stabilizing agents, flow agents, gloss enhancing agents, humectants, pH regulators, preservatives, rheology modifying agents, surface tension control agents, and anti-settling agents.

10. The ink composition as described in claim 6, wherein the solvent is water.

11. A coating for a cellulosic product, the coating comprising an admixture comprising:
    between 20%-60% weight percent of an acrylic resin dispersion;
    between 5%-30% weight percent of a pigment;
    between 20%-75% weight percent of an aqueous solvent; and
    between 0.5% to 5% weight percent of a hydrogenated, vegetable-derived wax, the wax being characterized by an iodine value between 2 to 5, and wherein the wax is a wax comprising 20% castor wax and 80% soybean wax by weight, whereby the coating, when applied to the cellulosic product, renders the coated cellulosic product resistant to mar and abrasion damage.

12. The coating as described in claim 11, wherein the wax comprises between 1%-3% of the composition.

13. The coating as described in claim 12, wherein the wax is further characterized by
    a. a melting point of approximately 185 degrees F. Mettler drop point;
    b. a softening point of approximately 156 degrees F.; and
    c. a Brookfield viscosity of approximately 10 cps at 100 degrees C.

14. The coating as described in claim 12, further comprising between 0.01%-5% weight percent of a defoaming agent.

15. The coating as described in claim 14, further comprising one or more agents selected from the group consisting of anti-misting agents, biocides, dispersing agents, antioxidants, ultraviolet light absorbing agents, light stabilizing agents, flow agents, gloss enhancing agents, humectants, pH regulators, preservatives, rheology modifying agents, surface tension control agents, and anti-settling agents.

16. A method to reduce mar and abrasion of a coated cellulosic article, the method comprising the steps of:
    preparing an admixture comprising:
    between 20%-60% weight percent of an acrylic resin dispersion;
    between 5%-30% weight percent of a pigment;
    between 20%-75% weight percent of an aqueous solvent; and
    between 0.5% to 5% weight percent of a hydrogenated, vegetable-derived wax, the wax being characterized by an iodine value between 2 to 5, and wherein the wax is a wax comprising 20% castor wax and 80% soybean wax by weight;
    applying the admixture to a surface of the cellulosic article; and
    allowing the applied admixture to dry, whereby the applied coating reduces mar and abrasion damage to the coated cellulosic product when the coated cellulosic product is subjected or one or more tests, the test selected from the group consisting of rubbing, abrasion, slip and gloss.

17. The method as described in claim 16, wherein the admixture further comprises between 0.01%-5% weight percent of a defoaming agent.

18. The method as described in claim 17, wherein the wax comprises between 1%-3% of the admixture.

19. The method as described in claim 18, wherein the wax is further characterized by:
    a. a melting point of approximately 185 degrees F. Mettler drop point;
    b. a softening point of approximately 156 degrees F.; and
    c. a Brookfield viscosity of approximately 10 cps at 100 degrees C.

20. The method as described in claim 17, wherein the admixture further comprises one or more agents selected from the group consisting of anti-misting agents, biocides, dispersing agents, antioxidants, ultraviolet light absorbing agents, light stabilizing agents, flow agents, gloss enhancing agents, humectants, pH regulators, preservatives, rheology modifiers, surface tension control agents, and anti-settling agents.

21. A cellulosic article coated with a mar and rub resistant composition, the composition comprising:
    between 20%-60% weight percent of an acrylic resin dispersion;
    between 5%-30% weight percent of a pigment;
    between 0.1%-1% weight percent of a defoaming agent,
    between 20%-75% weight percent of an aqueous solvent; and
    between 0.5% to 5% weight percent of a hydrogenated, vegetable-derived wax, the wax being characterized by an iodine value between 2 to 5; the wax being a mixture of 20% castor wax and 80% soybean wax by weight, and wherein the cellulosic article is selected from the group consisting of corrugated cardboard, kraft paper, linerboard, and paper.

* * * * *